US012339296B2

United States Patent
Popelka et al.

(10) Patent No.: US 12,339,296 B2
(45) Date of Patent: Jun. 24, 2025

(54) DYNAMIC RECALIBRATION OF OPTICAL AIR DATA SYSTEM

(71) Applicant: Honeywell International s.r.o., Praha-Chodov (CZ)

(72) Inventors: Jan Popelka, Neslovice (CZ); Timothy A. Peterson, Minneapolis, MN (US)

(73) Assignee: Honeywell International s.r.o. (CZ)

( * ) Notice: Subject to any disclaimer, the term of this patent is extended or adjusted under 35 U.S.C. 154(b) by 222 days.

(21) Appl. No.: 17/903,721

(22) Filed: Sep. 6, 2022

(65) Prior Publication Data

US 2024/0077511 A1 Mar. 7, 2024

(51) Int. Cl.
*G01P 5/16* (2006.01)
*G01P 21/00* (2006.01)
*G01S 17/88* (2006.01)

(52) U.S. Cl.
CPC ............... *G01P 5/16* (2013.01); *G01P 21/00* (2013.01); *G01S 17/88* (2013.01)

(58) Field of Classification Search
CPC ..... G01L 11/02; G01L 27/005; G01L 27/002; G01P 21/025; G01S 17/58
See application file for complete search history.

(56) References Cited

U.S. PATENT DOCUMENTS

| | | |
|---|---|---|
| 6,273,370 B1 | 8/2001 | Colgren |
| 6,894,768 B2 * | 5/2005 | Caldwell ............... G01S 7/4812 356/28 |
| 6,928,341 B2 * | 8/2005 | Wise ..................... G01P 13/025 701/6 |
| 7,106,447 B2 | 9/2006 | Hays |
| 7,522,291 B2 | 4/2009 | Tays et al. |

(Continued)

FOREIGN PATENT DOCUMENTS

| | | |
|---|---|---|
| CN | 110346605 B | 5/2021 |
| EP | 3301456 A1 | 4/2018 |

OTHER PUBLICATIONS

European Patent Office, "Extended European Search Report", from EP Application No. 23179707.7, from Foreign Counterpart to U.S. Appl. No. 17/903,721, filed Feb. 5, 2024, pp. 1 through 5, Published: EP.

(Continued)

*Primary Examiner* — Tran M. Tran
(74) *Attorney, Agent, or Firm* — Fogg & Powers LLC

(57) ABSTRACT

A system comprises a pressure air data system comprising non-optical air data sensors that interrogate a region of interest outside of a vehicle to determine a first set of air data measurements comprising a first static air pressure. The system also includes an optical air data system comprising optical air data sensors that interrogate the region of interest to determine a second set of air data measurements comprising a second static air pressure. The second static air pressure is determined using conversion coefficients. A processor receives and processes the first static air pressure; receives and processes the second static air pressure; dynamically recalibrates the conversion coefficients by computing a correction factor; sends the correction factor to the optical air data system to update the second static air pressure; and outputs an optimized static air pressure based on the first static air pressure and the updated second static air pressure.

20 Claims, 4 Drawing Sheets

(56) References Cited

U.S. PATENT DOCUMENTS

| | | | |
|---|---|---|---|
| 8,527,233 B2 | 9/2013 | McIntyre | |
| 8,908,160 B2* | 12/2014 | Dakin | G01S 17/95 |
| | | | 356/28 |
| 9,801,026 B2* | 10/2017 | Birkenes | G06Q 10/1095 |
| 10,241,198 B2* | 3/2019 | LaChapelle | G01S 7/4868 |
| 10,352,813 B2* | 7/2019 | Cooper | G01L 27/002 |
| 10,444,367 B2 | 10/2019 | Lodden et al. | |
| 10,473,684 B2* | 11/2019 | Wu | G01P 13/00 |
| 10,527,724 B2* | 1/2020 | Lodden | B64D 43/02 |
| 11,169,173 B2 | 11/2021 | Sly et al. | |
| 11,300,584 B2* | 4/2022 | Caldwell | G01S 17/58 |
| 11,428,820 B1* | 8/2022 | Barr | G01S 19/42 |
| 11,435,234 B1* | 9/2022 | Keaveney | H03H 17/0257 |
| 11,508,247 B2* | 11/2022 | Saxena | B64D 47/06 |
| 11,754,484 B2* | 9/2023 | Fan | G01S 17/95 |
| | | | 356/338 |
| 11,774,594 B2* | 10/2023 | Peterson | G01S 17/95 |
| | | | 356/5.01 |
| 11,851,193 B2* | 12/2023 | Sly | G01P 13/025 |
| 2003/0219252 A1* | 11/2003 | Hays | G01S 17/58 |
| | | | 398/118 |
| 2011/0043785 A1* | 2/2011 | Cates | G01P 5/26 |
| | | | 356/28 |
| 2016/0305977 A1 | 10/2016 | Genevrier et al. | |
| 2017/0276790 A1 | 9/2017 | Lodden et al. | |
| 2018/0088238 A1* | 3/2018 | Garde | G01S 17/88 |
| 2018/0120439 A1* | 5/2018 | Garde | G01S 17/58 |
| 2018/0224299 A1* | 8/2018 | Wiebold | G01S 17/58 |
| 2019/0146001 A1* | 5/2019 | Prosser | G01P 21/025 |
| | | | 73/182 |
| 2019/0187280 A1* | 6/2019 | Lodden | B64D 43/02 |
| 2019/0210740 A1* | 7/2019 | Luo | G01P 3/62 |
| 2019/0217966 A1 | 7/2019 | Winter | |
| 2019/0302141 A1* | 10/2019 | Caldwell | G01S 7/4816 |
| 2022/0128029 A1* | 4/2022 | Kimilli | G01N 29/4436 |

OTHER PUBLICATIONS

Majeed et al. "Multi sensor data fusion based approach for the calibration of airdata systems", The Aeronautical Journal, vol. 115, Feb. 2011, pp. 113 through 122.

Ophir, "Laser Radar Air Data System (LRADS) for Next Generation Aircraft", as dowloaded from https://www.ophir.com/optical-air-data-system/ on May 13, 2022, pp. 1 through 2.

* cited by examiner

DYNAMIC RECALIBRATION OF OPTICAL AIR DATA SYSTEM

STATEMENT REGARDING GOVERNMENT SPONSORED RESEARCH OR DEVELOPMENT

The project leading to this application has received funding from the Clean Sky 2 Joint Undertaking under the European Union's Horizon 2020 research and innovation program under grant agreement No. 807097.

BACKGROUND

Optical air data systems can measure air density because of the proportionality between the air density and the molecular signal backscatter intensity. If the air temperature is also known, the static air pressure can be calculated with the Ideal Gas Law. Calculating static air density and pressure from the molecular signal backscatter intensity is performed using conversion coefficients. The conversion coefficients are determined from various quantities, such as laser power, transmitter-receiver alignment, aperture size, and optical element throughput. In general, these quantities may vary due to known or unknown effects. Therefore, the conversion coefficients may need to be calibrated frequently. Current approaches require regular system recalibration, which requires the need for certified devices and causes high maintenance costs.

SUMMARY

A system comprises a pressure air data system mounted on a vehicle and including one or more non-optical air data sensors, wherein the one or more non-optical air data sensors are configured to interrogate a region of interest outside of the vehicle to determine a first set of air data measurements comprising at least a first static air pressure. The system also includes an optical air data system mounted on the vehicle and comprising one or more optical air data sensors, wherein the one or more optical air data sensors are configured to interrogate the region of interest to determine a second set of air data measurements comprising at least a second static air pressure. The second static air pressure is determined using one or more conversion coefficients. At least one system processor is operatively coupled to the pressure air data system and the optical air data system. The system processor is operative to receive and process the first static air pressure from the pressure air data system; receive and process the second static air pressure from the optical air data system; dynamically recalibrate the one or more conversion coefficients by computing at least one correction factor for the optical air data system; send the correction factor to the optical air data system to update the second static air pressure; and output an optimized static air pressure based on the first static air pressure and the updated second static air pressure. The optical air data system is configured to be used as a backup in case of failure of the pressure air data system.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for dynamic recalibration of an optical air data system is described herein.

In order to use an optical air data system to obtain air data measurements such as static air pressure, calibration of conversion coefficients is needed. The calibration needs to be done frequently in order to provide signal outputs with a required precision. The present approach provides a method for dynamic recalibration of the optical air data system. This provides a reduction in the cost of regular maintenance calibration, while improving the performance of the optical air data system.

The present optical air data system can be used as a backup in case of failure of a legacy air data system such as a pressure air data system. The dynamic recalibration of the optical air data system enables a required performance of the optical air data system so it can be used as the main air data system in case of failure of the pressure air data system.

Further details regarding the present approach are described as follows and with reference to the drawings.

Figure 1:
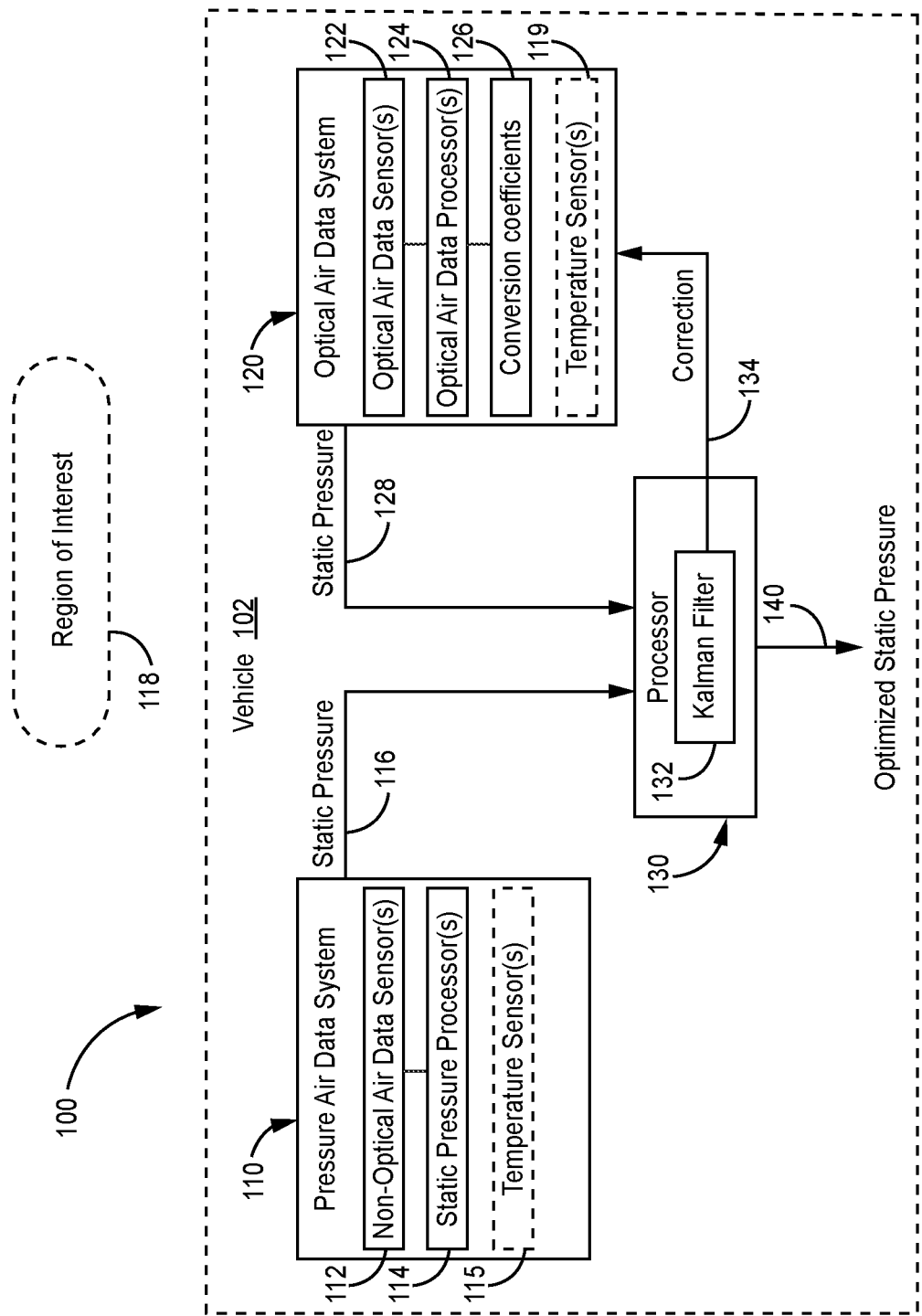
FIG. 1 is a block diagram of a system for dynamic recalibration of an optical air data system, according to one embodiment.

FIG. 1 is a block diagram of a system 100 for dynamic recalibration, according to one embodiment. The system 100 generally comprises a pressure air data system 110 onboard a vehicle 102, such as an aircraft, and an optical air data system 120 onboard vehicle 102. An onboard system processor 130 is in operative communication with pressure air data system 110, and with optical air data system 120. The system processor 130 can include or be in communication with one or more memory units (not shown), which are configured to store program instructions and data.

The pressure air data system 110 includes one or more non-optical air data sensors 112, and at least one static pressure processor 114 operatively coupled to non-optical air data sensors 112. The non-optical air data sensors 112 are configured to interrogate an atmospheric region of interest 118 outside of vehicle 102, and to provide sensor data to static pressure processor 114, which determines a first set of air data measurements comprising at least a first static air pressure 116.

In example embodiments, non-optical air data sensors 112 can include one or more static pressure sensors such as pitot tubes, static ports, or the like. In addition, one or more temperature sensors 115 can be optionally employed in pressure air data system 110.

The optical air data system 120 includes one or more optical air data sensors 122, and at least one optical air data processor 124 operatively coupled to optical air data sensors 122. The optical air data sensors 122 are configured to interrogate region of interest 118, and to provide sensor data to optical air data processor 124, which determines a second set of air data measurements comprising at least a second static air pressure 128. The second static air pressure 128 is determined using one or more conversion coefficients 126, as discussed in further detail hereafter.

In example embodiments, optical air data sensors 122 can include one or more light detection and ranging (LiDAR) sensors, which are configured to transmit light into region of interest 118, and collect a scattered portion of the transmitted light from region of interest 118. In addition, one or more temperature sensors 119 can be optionally employed in optical air data system 120.

The system processor 130 is operative to receive and process the first static air pressure 116 from pressure air data system 110. The system processor 130 is also operative to receive and process the second static air pressure 128 from optical air data system 120. In one embodiment, processor 130 hosts a Kalman filter 132, which can be used to dynamically recalibrate conversion coefficients 126 by computing a correction factor 134, which is output to optical air data system 120. The Kalman filter 132 is also operative to estimate a best static pressure output from pressure air data system 110 and optical air data system 120. Further details related to the Kalman filter are discussed hereafter.

The correction factor 134 is applied to recalibrate conversion coefficients 126 such that an updated second static air pressure 128 is output by optical air data system 120 in the next measurement cycle. The processor 130 outputs an optimized static air pressure 140 based on the first static air pressure 116 from pressure air data system 110, and the updated second static air pressure 128 from optical air data system 120.

The optical air data system 120 can also be configured as a backup air data system in case of failure of pressure air data system 110.

During operation of system 100, optical air data system 120 can compute the static air pressure from a molecular signal backscatter intensity using the ideal gas law, expressed as:

$$P_{calc} = \frac{Nk_bT}{V}$$

where $P_{calc}$ is a calculated pressure, N is the number of air molecules, $k_b$ is the Boltzmann constant, T is a static air temperature calculated from the optical air data system, and V is a volume of the measured area.

Because the optical air data system is not directly measuring the number of air molecules, but rather the molecular signal backscatter intensity, the number of air molecules can be calculated as:

$$N = N_m C$$

where $N_m$ is the molecular signal backscatter intensity and C is the conversion constant. Using both the pressure air data system and the optical air data system enables to calculate molecular signal backscatter intensity to number of molecules conversion coefficients, expressed as:

$$C = \frac{P_{ref-1}}{P_{calc-1}}$$

where $P_{ref-1}$ is the static air pressure measured by the pressure air data system in a previous measurement cycle, and $P_{calc-1}$ is the static air pressure calculated as:

$$P_{calc-1} = \frac{N_m k_b T}{V}.$$

In case of failure of the pressure air data system 110, optical air data system 120 does not update the conversion constant, but instead uses the latest conversion constant to maintain the best performance possible.

Figure 2:
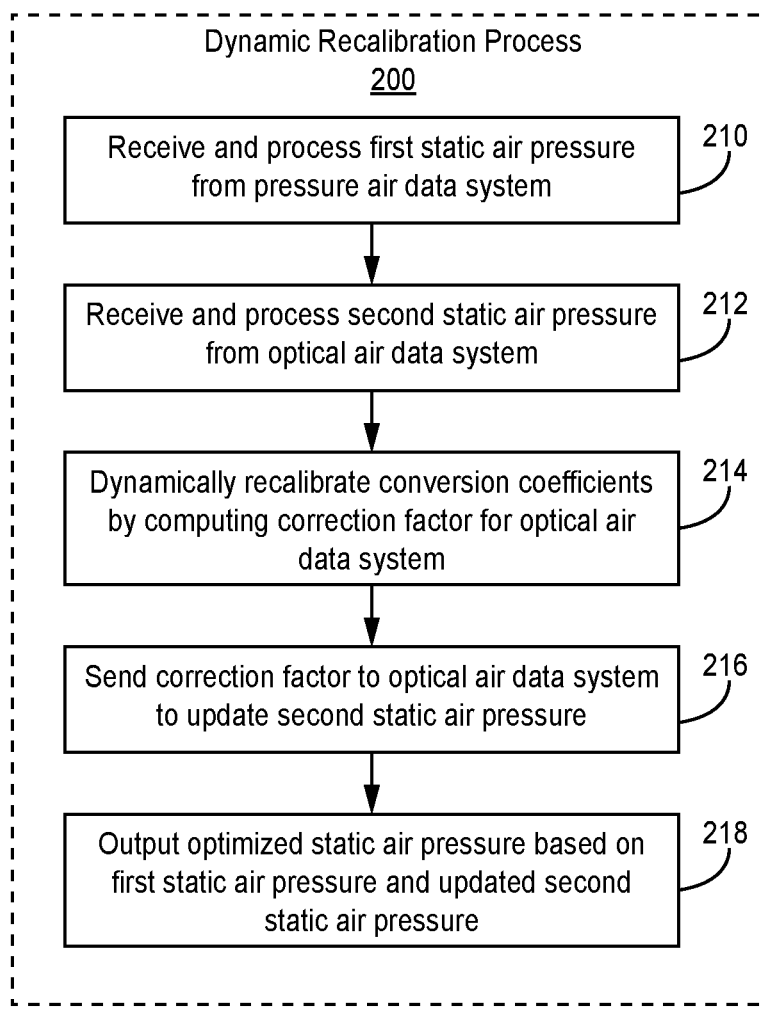
FIG. 2 is a flow diagram of a method for dynamic recalibration of an optical air data system, according to one implementation.

FIG. 2 is a functional flow diagram of a dynamic recalibration process 200 performed by a Kalman filter, according to an exemplary implementation. In process 200, the Kaman filter is operative to receive and process a first static air pressure from the pressure air data system (block 210); and receive and process a second static air pressure from the optical air data system (block 212). Thereafter, the Kalman filter dynamically recalibrates conversion coefficients by computing a correction factor for the optical air data system (block 214), based on the first and second static air pressures. The Kalman filter sends the correction factor to the optical air data system to update the second static air pressure in a next measurement cycle (block 216). Subsequently, the Kalman filter outputs an optimized static air pressure based on the first static air pressure and the updated second static air pressure (block 218).

Figure 3:
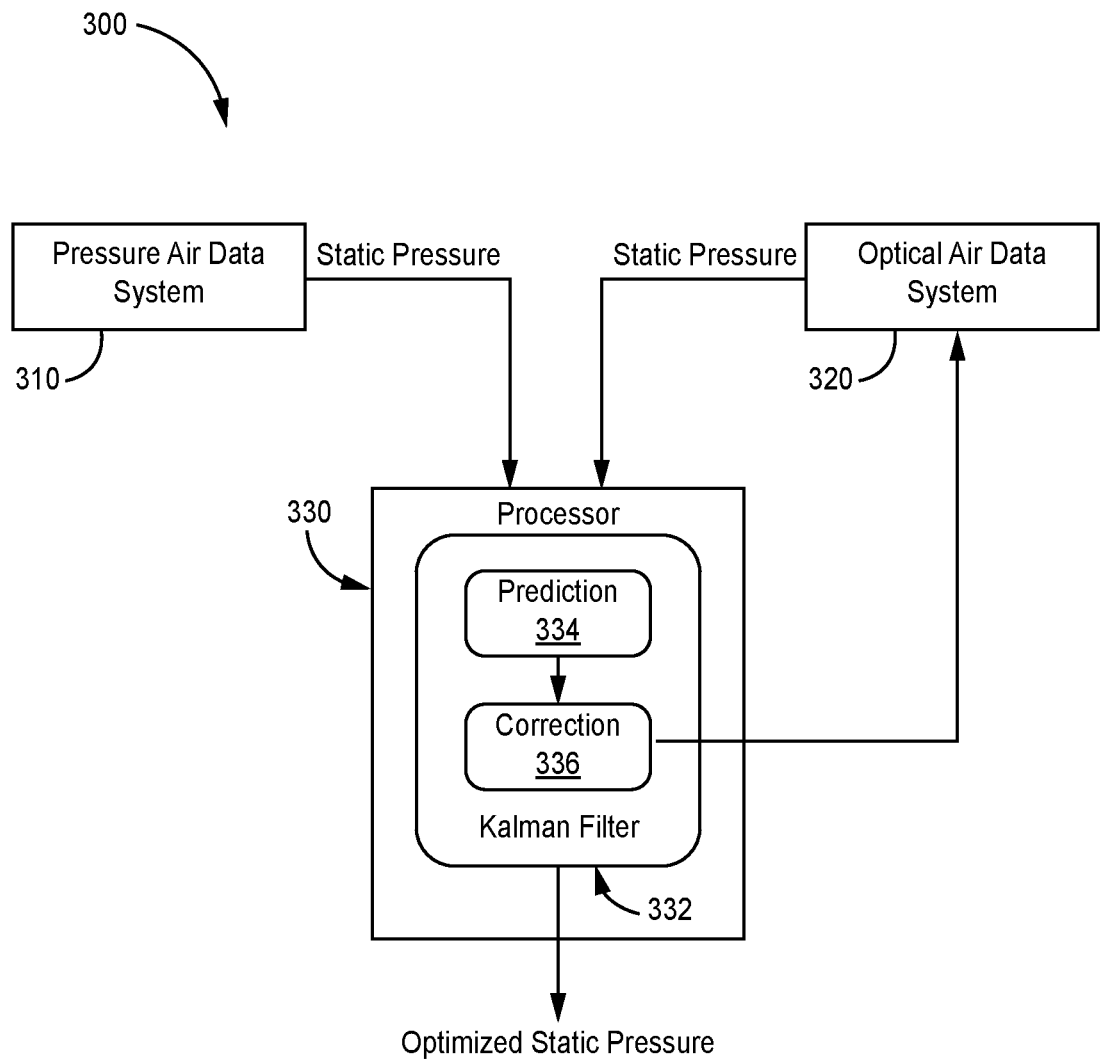
FIG. 3 is a block diagram of a system for dynamic recalibration of an optical air data system, according to another embodiment.

FIG. 3 is a block diagram of a system 300 for dynamic recalibration using a Kalman filter, according to another embodiment. The system 300 generally comprises a pressure air data system 310 onboard a vehicle, and an onboard optical air data system 320. An onboard system processor 330 is in operative communication with pressure air data system 310, and with optical air data system 320.

The pressure air data system 310 includes non-optical air data sensors configured to interrogate an atmospheric region of interest outside of the vehicle, and to provide sensor data that is used to determine a first static air pressure. The optical air data system 320 includes optical air data sensors configured to interrogate the region of interest, and to provide sensor data that is used to determine a second static air pressure. The second static air pressure is determined using one or more conversion coefficients, as described previously.

The system processor 330 is operative to receive and process the first static air pressure from pressure air data system 310, and the second static air pressure from optical air data system 320. The processor 330 hosts a Kalman filter 332, which is used to dynamically recalibrate the conversion coefficients. The Kalman filter 332 includes a prediction module 334, and a correction module 336 configured to receive an output from prediction module 334. The prediction module 334 is configured to receive and process the first and second static air pressures. The correction module 336 receives the output from prediction module 334, which is used to compute a correction factor for recalibrating the conversion coefficients. A correction signal corresponding to the correction factor is sent from correction module 336 to an input of optical air data system 320.

The correction factor is applied to recalibrate the conversion coefficients such that an updated second static air pressure is output by optical air data system 320 in a next measurement cycle. The processor 330 outputs an optimized static air pressure based on the first static air pressure from pressure air data system 310, and the updated second static air pressure from optical air data system 330.

Figure 4:
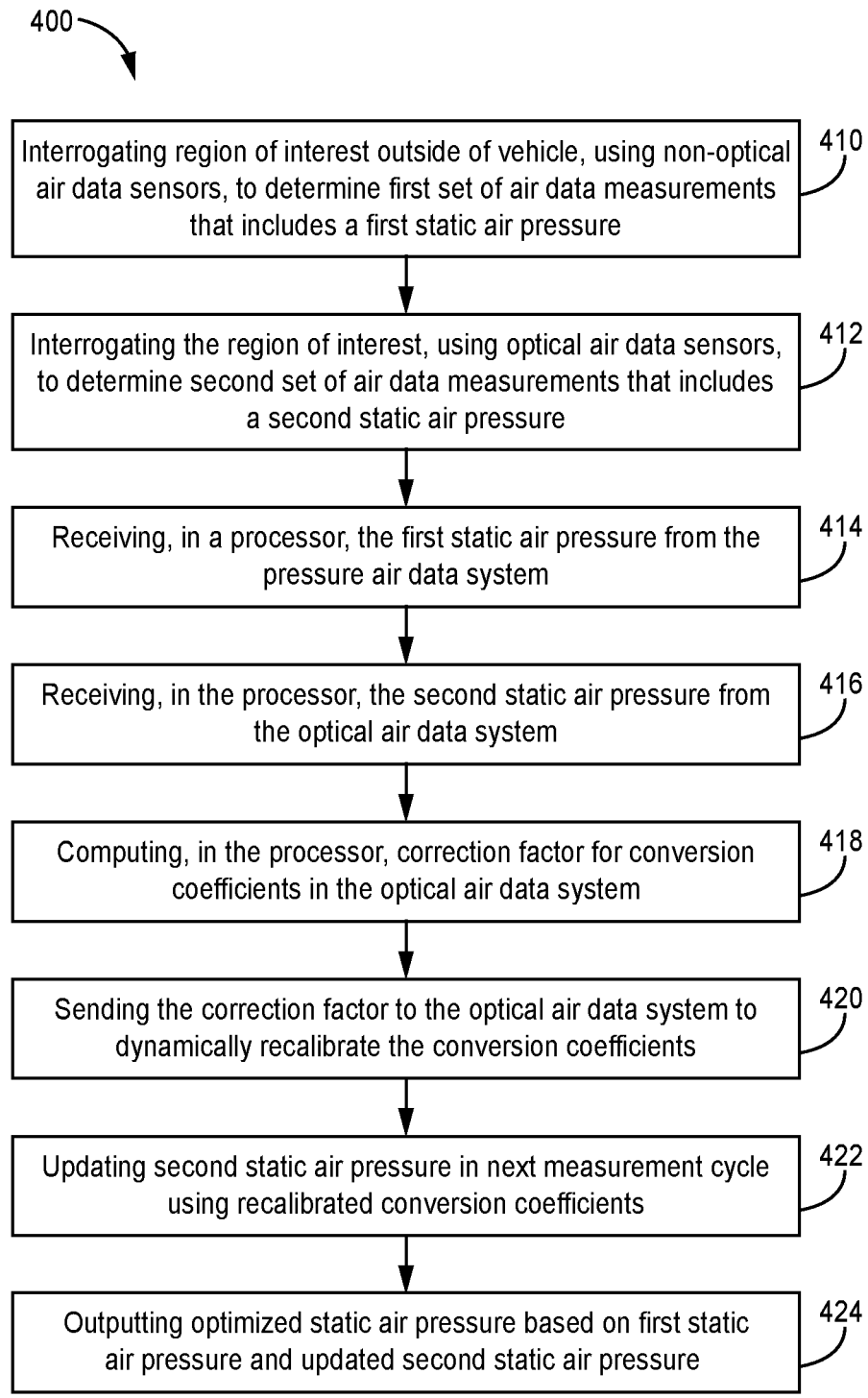
FIG. 4 is a flow diagram of a method for dynamic recalibration of an optical air data system, according to another implementation.

FIG. 4 is a flow diagram of an exemplary method 400 for dynamic recalibration of an optical air data system, which is employed in conjunction with a pressure air data system onboard a vehicle such as an aircraft. The pressure air data system includes non-optical air data sensors, and the optical air data system includes optical air data sensors. The method 400 comprises interrogating a region of interest outside of the vehicle, using the non-optical air data sensors, to determine a first set of air data measurements that includes a first static air pressure (block 410); and interrogating the region of interest, using the optical air data sensors, to determine a second set of air data measurements that includes a second static air pressure (block 412). The second static air pressure is determined using one or more conversion coefficients saved in a memory of the optical air data system. The method 400 further comprises receiving, in a processor, the first static air pressure from the pressure air data system (block 414); and receiving, in the processor, the second static air pressure from the optical air data system (block 416). Thereafter, method 400 computes, in the processor, at least one correction factor for the one or more conversion coefficients in the optical air data system (block 418). The method 400 then sends the at least one correction factor to the optical air data system to dynamically recalibrate the one or more conversion coefficients (block 420). The method 400 performs updating of the second static air pressure in a next measurement cycle using the recalibrated one or more conversion coefficients (block 422). Subsequently, method 400 comprises outputting, from the processor, an optimized static air pressure based on the first static air pressure and the updated second static air pressure (block 424).

The processing units and/or other computational devices used in systems and methods described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: a pressure air data system mounted on a vehicle and comprising one or more non-optical air data sensors, wherein the one or more non-optical air data sensors are configured to interrogate a region of interest outside of the vehicle to determine a first set of air data measurements comprising at least a first static air pressure; an optical air data system mounted on the vehicle and comprising one or more optical air data sensors, wherein the one or more optical air data sensors are configured to interrogate the region of interest to determine a second set of air data measurements comprising at least a second static air pressure, wherein the second static air pressure is determined using one or more conversion coefficients; and at least one system processor operatively coupled to the pressure air data system and the optical air data system, the at least one system processor operative to: receive and process the first static air pressure from the pressure air data system; receive and process the second static air pressure from the optical air data system; dynamically recalibrate the one or more conversion coefficients by computing at least one correction factor for the optical air data system; send the correction factor to the optical air data system to update the second static air pressure; and output an optimized static air pressure based on the first static air pressure and the updated second static air pressure; wherein the optical air data system is configured as a backup system in case of failure of the pressure air data system.

Example 2 includes the system of Example 1, wherein the one or more non-optical air data sensors comprise one or more static pressure sensors.

Example 3 includes the system of Example 2, wherein the one or more static pressure sensors comprise one or more pitot tubes, one or more static pressure ports, or combinations thereof.

Example 4 includes the system of any of Examples 1-3, wherein the pressure air data system further comprises one or more temperature sensors.

Example 5 includes the system of any of Examples 1-4, wherein the pressure air data system further comprises at least one static pressure processor operatively coupled to the one or more non-optical air data sensors.

Example 6 includes the system of any of Examples 1-5, wherein the one or more optical air data sensors comprise one or more light detection and ranging (LiDAR) sensors.

Example 7 includes the system of any of Examples 1-6, wherein the optical air data system further comprises one or more temperature sensors.

Example 8 includes the system of any of Examples 1-7, wherein the optical air data system further comprises at least one optical air data processor operatively coupled to the one or more optical air data sensors.

Example 9 includes the system of any of Examples 1-8, wherein the at least one system processor hosts a Kalman filter that is operative to dynamically recalibrate the one or more conversion coefficients by computing the at least one correction factor for the optical air data system.

Example 10 includes the system of any of Examples 1-9, wherein the at least one correction factor is applied by the optical air data system to recalibrate the one or more conversion coefficients used to update the second static air pressure in a next measurement cycle.

Example 11 includes the system of any of Examples 1-10, wherein the vehicle is an aircraft.

Example 12 includes a method comprising: providing a pressure air data system comprising one or more non-optical air data sensors, onboard a vehicle; providing an optical air data system comprising one or more optical air data sensors, onboard the vehicle; interrogating a region of interest outside of the vehicle, using the one or more non-optical air data sensors, to determine a first set of air data measurements comprising a first static air pressure; interrogating the region of interest, using the one or more optical air data sensors, to determine a second set of air data measurements comprising a second static air pressure, wherein the second static air pressure is determined in the optical air data system using one or more conversion coefficients; receiving, in a processor, the first static air pressure from the pressure air data system; receiving, in the processor, the second static air pressure from the optical air data system; computing, in the processor, at least one correction factor for the one or more conversion coefficients; sending the at least one correction factor to the optical air data system to dynamically recalibrate the one or more conversion coefficients; updating the second static air pressure in a next measurement cycle using the recalibrated one or more conversion coefficients; and outputting, from the processor, an optimized static air pressure based on the first static air pressure and the updated second static air pressure.

Example 13 includes the method of Example 12, wherein the optical air data system is configurable for use as a backup system in case of failure of the pressure air data system.

Example 14 includes the method of any of Examples 12-13, wherein the one or more non-optical air data sensors comprise one or more static pressure sensors.

Example 15 includes the method of Example 14, wherein the one or more static pressure sensors comprise one or more pitot tubes, one or more static pressure ports, or combinations thereof.

Example 16 includes the method of any of Examples 12-15, wherein the pressure air data system further comprises one or more temperature sensors.

Example 17 includes the method of any of Examples 12-16, wherein the one or more optical air data sensors comprise one or more light detection and ranging (LiDAR) sensors.

Example 18 includes the method of any of Examples 12-17, wherein the optical air data system further comprises one or more temperature sensors.

Example 19 includes the method of any of Examples 12-18, wherein the processor hosts a Kalman filter that is operative to compute the at least one correction factor for the one or more conversion coefficients.

Example 20 includes the method of any of Examples 12-19, wherein the vehicle is an aircraft.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
a pressure air data system mounted on a vehicle and comprising one type of one or more non-optical air data sensors, wherein the one type of the one or more non-optical air data sensors are configured to interrogate a region of interest outside of the vehicle to determine a first set of air data measurements comprising at least a first static air pressure;
an optical air data system mounted on the vehicle and comprising one or more optical air data sensors, wherein the one or more optical air data sensors are configured to interrogate the region of interest to determine a second set of air data measurements comprising at least a second static air pressure, wherein the second static air pressure is determined using one or more conversion coefficients; and
at least one system processor operatively coupled to the pressure air data system and the optical air data system, the at least one system processor operative to:
receive and process the first static air pressure from the pressure air data system;
receive and process the second static air pressure from the optical air data system;
dynamically recalibrate the one or more conversion coefficients by computing at least one correction factor for the optical air data system;
send the correction factor to the optical air data system to update the second static air pressure;
calculate an optimized air pressure based on the first static air pressure and the updated second static air pressure; and
output the optimized air pressure;
wherein the optical air data system is configured as a backup system in case of failure of the pressure air data system.

2. The system of claim 1, wherein the one type of the one or more non-optical air data sensors comprise one or more static pressure sensors.

3. The system of claim 2, wherein the one or more static pressure sensors comprise one or more pitot tubes, one or more static pressure ports, or combinations thereof.

4. The system of claim 1, wherein the pressure air data system further comprises one or more temperature sensors.

5. The system of claim 1, wherein the pressure air data system further comprises at least one static pressure processor operatively coupled to the one type of the one or more non-optical air data sensors.

6. The system of claim 1, wherein the one or more optical air data sensors comprise one or more light detection and ranging (LiDAR) sensors.

7. The system of claim 1, wherein the optical air data system further comprises one or more temperature sensors.

8. The system of claim 1, wherein the optical air data system further comprises at least one optical air data processor operatively coupled to the one or more optical air data sensors.

9. The system of claim 1, wherein the at least one system processor hosts a Kalman filter that is operative to dynamically recalibrate the one or more conversion coefficients by computing the at least one correction factor for the optical air data system.

10. The system of claim 9, wherein the at least one correction factor is applied by the optical air data system to recalibrate the one or more conversion coefficients used to update the second static air pressure in a next measurement cycle.

11. The system of claim 1, wherein the vehicle is an aircraft.

12. A method comprising:
providing a pressure air data system comprising one type of one or more non-optical air data sensors, onboard a vehicle;
providing an optical air data system comprising one or more optical air data sensors, onboard the vehicle;
interrogating a region of interest outside of the vehicle, using the one type of the one or more non-optical air data sensors, to determine a first set of air data measurements comprising a first static air pressure;
interrogating the region of interest, using the one or more optical air data sensors, to determine a second set of air data measurements comprising a second static air pressure, wherein the second static air pressure is determined in the optical air data system using one or more conversion coefficients;
receiving, in a processor, the first static air pressure from the pressure air data system;
receiving, in the processor, the second static air pressure from the optical air data system;
computing, in the processor, at least one correction factor for the one or more conversion coefficients;
sending the at least one correction factor to the optical air data system to dynamically recalibrate the one or more conversion coefficients;
updating the second static air pressure in a next measurement cycle using the recalibrated one or more conversion coefficients;
calculating, in the processor, an optimized air pressure based on the first static air pressure and the updated second static air pressure; and
outputting, from the processor, the optimized air pressure.

13. The method of claim 12, wherein the optical air data system is configurable for use as a backup system in case of failure of the pressure air data system.

14. The method of claim 12, wherein the one type of the one or more non-optical air data sensors comprise one or more static pressure sensors.

15. The method of claim 14, wherein the one or more static pressure sensors comprise one or more pitot tubes, one or more static pressure ports, or combinations thereof.

16. The method of claim 12, wherein the pressure air data system further comprises one or more temperature sensors.

17. The method of claim 12, wherein the one or more optical air data sensors comprise one or more light detection and ranging (LiDAR) sensors.

18. The method of claim 12, wherein the optical air data system further comprises one or more temperature sensors.

19. The method of claim 12, wherein the processor hosts a Kalman filter that is operative to compute the at least one correction factor for the one or more conversion coefficients.

20. The method of claim 12, wherein the vehicle is an aircraft.

* * * * *